(12) United States Patent
Witteried

(10) Patent No.: US 6,247,145 B1
(45) Date of Patent: Jun. 12, 2001

(54) AUTOMATED RELIABILITY AND MAINTAINABILITY PROCESS

(75) Inventor: David C. Witteried, California City, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/075,436

(22) Filed: May 11, 1998

(51) Int. Cl.⁷ ........................................ H05K 10/00
(52) U.S. Cl. .............................. 714/33; 714/47
(58) Field of Search ................... 714/1, 33, 41, 714/47, 57

(56) References Cited

U.S. PATENT DOCUMENTS

| | | | |
|---|---|---|---|
| 4,472,804 | * 9/1984 | Fullwood et al. | 714/33 |
| 4,695,946 | * 9/1987 | Andreasen et al. | 364/200 |
| 4,707,796 | * 11/1987 | Calabro et al. | 702/34 |
| 5,740,429 | * 4/1998 | Wang et al. | 707/104 |
| 5,967,975 | * 10/1999 | Ridgeway | 600/300 |

* cited by examiner

Primary Examiner—Dennis M. Butler
(74) Attorney, Agent, or Firm—William G. Auton

(57) ABSTRACT

The PC SEDS database system provides a flexible database system that can encompass any type of Reliability and Maintainability (R&M) evaluation, while accurately storing and characterizing the collected data. The PC SEDS database system includes interfaces for entering, editing, processing, and analyzing the stored data. Front-end programs tailor themselves based upon information stored in a set of look-up tables. This allows the same programs to be used for a variety of projects without rewriting any code.

1 Claim, 6 Drawing Sheets

SEDS Process

AUTOMATED RELIABILITY AND MAINTAINABILITY PROCESS

STATEMENT OF GOVERNMENT INTEREST

The invention described herein may be manufactured and used by or for the Government for governmental purposes without the payment of any royalty thereon.

REFERENCE TO MICROFICHE APPENDIX

Reference is made to the microfiche appendix which contains 350 pages of the system source code.

BACKGROUND OF THE INVENTION

The present invention relates generally to systems which provide reliability and maintainability evaluation, and more specifically, to a system effectiveness data system (SEDS) for use on personal computers (PC).

Managing reliability and maintainability of operating systems is an ongoing technical challenge. Computer systems for reliability and maintainability analysis are disclosed in the following U.S. Patents, the disclosure of which are incorporated herein by reference:

U.S. Pat. No. 4,707,796 issued to Calabro et al; and

U.S. Pat. No. 4,472,804 issued to Fallwood et al.

The PCSEDS database is a major improvement over the original AFTEC COBAL database with the same name. The PC SEDS has added new capabilities to categorize and evaluate reliability and maintainability data for any test article. These improvements allow a nonprogrammer user to quickly extract results and build ad-hoc reports without a full-time programmer. Also, the front-end programs can be used for many different projects without modification.

SUMMARY OF THE INVENTION

The PC SEDS database system is designed to provide a flexible database system that can encompass any type of Reliability and Maintainability (R&M) evaluation, while accurately storing and characterizing the collected data. The PC SEDS database system includes interfaces for entering, editing, processing, and analyzing the stored data. Highlights of some of the unique capabilities are: Front-end programs tailor themselves based upon information stored in a set of look-up tables. This allows the same programs to be used for a variety of projects without rewriting any code. Non-programmers can customize analysis tools for special reports. Data can be analyzed using more than one set of part identifier codes at the click of a mouse button. Report criteria are set using a graphical menu system. Attaching additional tables can easily extend database capabilities. Easily exchanges data with other Windows programs. Database programs assist the user by making recommendations on categorizing results and looking up information, thereby increasing accuracy of the data.

The present invention allows remote users to input failure data that is used for reliability and maintainability decisions using the source code of the attached microfiche, and commercial off the shelf equipment including an Oracle client server and Microsoft Access versions of personal computers.

Database programs assist the user by making recommendations on categorizing results and looking up information, thereby increasing accuracy of the data. Algorithms in the database programs are used to process new data and provide recommendations on failure categories and parts, which may have initiated a string of failures. However, the user can override the database recommendation simply by changing the data. Gaming or second-guessing the database system is not necessary.

Database entry tools increase the accuracy of the data by providing the data collector with lookup and basic search tools.

The data collection program (or entire system) can be deployed to a remote location using a laptop computer.

Reports and other database products can be distributed via E-mail, thereby increasing timeliness and reducing costs.

Modifications to the database are accomplished using a graphical user interface, Microsoft Access.

Since PC SEDS is based upon a Structured Query Language (SQL) database engine (Microsoft Access), the basic table structure; algorithms; and in some cases, source code; can be upscaled to a client-server database using database programs such as Sun Micosystems ORACLE, Microsoft SQL Server or others.

PC SEDS can be modified to perform as a Failure Reporting and Corrective Action system (FRACAS) database with the addition of a few tables. A FRACAS database is used by a manufacturer to track failures and design changes through a products life style.

PC SEDS can be modified to store, process, and analyze reliability and maintainability data for products that are operated on a twenty-four hour basis.

It is an object of the present invention to store reliability and maintainability data.

It is another object of the invention to allow flexible categorization of data and be adaptable to many test programs.

It is another object of the invention to simplify data queries and provide data accessibility to engineers.

These and other advantages, objects and features of the invention will become more apparent after considering the following description taken in conjunction with the illustrative embodiment in the accompanying drawings.

DESCRIPTION OF THE DRAWINGS

FIGS. 1 and 3 are illustrations of the SEDS process;

DETAILED DESCRIPTION OF THE PREFERRED EMBODIMENTS

Figure 1:
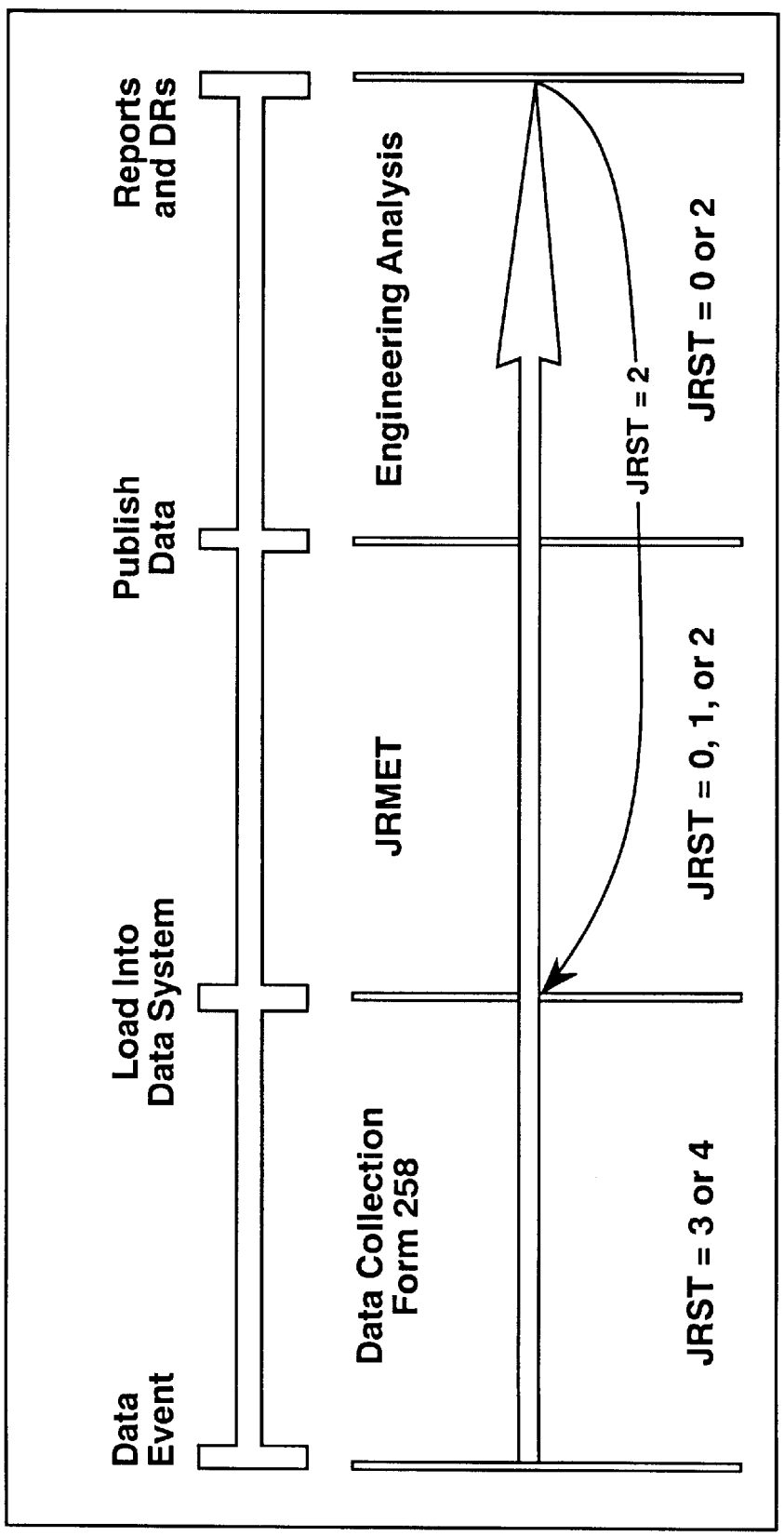

The SEDS database was originally developed using the COBOL programming language. It was designed to be a modular database system that could be easily modified for many different test projects, while remaining platform (i.e. computer system) independent. Since then the relational database system has been developed and personal computers have become more powerful, and client-server databases have become the standard. With the deactivation of the Air Force Test Centers mainframe computer the development of a new SEDS database was begun.

Two versions of the SEDS database have been developed using relational database systems hosted in Sun's ORACLE and Microsoft's Access database programs. The ORACLE development platform is used for large test efforts, or when a robust client-server design was required. While the Microsoft Access version is used for smaller programs where the client-server model is not required. Both database systems share a common database schema (i.e. structure, field names, and rules). They also use a common set of algorithms in instances when the database programs automatically determine certain codes.

This discussion describes the SEDS database system. It is intended to provide a comprehensive understanding of the purpose and operation of the SEDS database.

The System Effectiveness Data System (SEDS) is best described as a method for storing a characterizing R&M data. It is implements as a computer database system. The original SEDS was hosted on a mainframe computer using the COBOL programming language. It has subsequently been redesigned as a relational database system hosted on Personal Computers using Microsoft Access as well as being hosted on Work Station class computers (Client-Server) using ORACLE.

The primary objective of the SEDS database system is to provide a flexible data system that can encompass any type of R&M evaluation, while accurately storing and characterizing the collected data.

A secondary objective is that SEDS should also be scaleable to the requirements of the test program. If necessary the system can be moved to a more powerful computer platform without requiring any modification (e.g. PC to Client-Server). This was accomplished by having both platforms share a common database schema (i.e. design) and algorithms for determining coding of R&M data.

Other objectives were:

To allow the customization of the database system without forcing major rewriting of the original system Be able to use PC based analysis tools Increase the accuracy of data collection by providing better data entry tools Permit extension of the database system by taking advantage of relational database features Be computer platform independent.

A list of general terms used in the SEDS database is shown below. Additional terminology will be introduced later in this document, but a basic understanding of these important terms is necessary to understand why the database is designed the way it is.

An Event in SEDS is defined as a group of records (Items) with the same Job control Number (JCN) on the same test item. An Event describes the repair action for a single inherent failure. Multiple induced or no-defect failures are permitted within a single Event.

An item in SEDS is defined as a single record based upon a Form 258-1. An Item describes the maintenance performed on a test item for a twenty-four hour period. A new Form 258-1 must be initiated at the beginning of each day.

The JRMET Status (JRST) of an Item determines how SEDS will process a record, or use it during data reduction and analysis. There are eight JRMET Status codes by the database system. They are:

TABLE 1

| Code | Definition | Record Disposition or Usage |
| --- | --- | --- |
| −1 | Pre-JRMET reviewed | Do not use in analysis. Include in JRMET MEVENT. Do not alter failure type. |
| 0 | JRMET approved | Use for analysis. |
| 1 | New record, processed by SEDS | Do not use in analysis. Include in JRMET MEVENT. Recommend failure type. |
| 2 | JRMET bring-back | Use for analysis. Include record in next JRMET MEVENT Do not alter failure type. |
| 3 | New record, not processed by SEDS | Do not use in analysis. Record can be modified by data entry program. |
| 4 | New record, sent to SEDS | Do not use in analysis. Record can not be modified by data entry program. |
| 5 | New record, held by data entry technician for clarification | Do not use in analysis. Record will not be exported to or processed by SEDS for JRMET review. Record can be modified by data entry program. |
| 6 | New record, held by data entry system for required information | Do not use in analysis. Record will not be exported to or processed by SEDS for JRMET review. Record can be modified by data entry program. |

The SEDS process can be broken down in three phases: Data Collection, JRMET, and Engineering Analysis. These phases delineated by four milestones in the flow of information through the SEDS system. In the following sections each of the milestones and phases will be described in detail. The arrow looping back to the beginning of the JET phase indicates records that are reviewed by the JRMET.

The SEDS process begins with a data event. Data events involve information that the R&M engineer is interested in capturing with the database for analysis at a latter date. Data events can involve a failure, preventative maintenance, maintenance to correct a failure condition, and general aircraft servicing tasks.

The data collection phase begins after a data event has occurred. This phase usually involves close cooperation between the R&M engineer and the maintenance organization that takes care of the test item. The maintainers use a Form 258-1 to record data for on-equipment maintenance. A Form 258-2 is used to record off-equipment maintenance performed in a shop or depot facility. Instructions and procedures for using the Form 258½ are provided to the maintainers in a SEDS Data Collection Handbook. This handbook contains detailed instructions on how to record each data element on the data collection form.

Data is normally collected on the Form 258½ and reviewed by the maintenance supervisor. After being reviewed, the data is then entered in the SEDS database system. This can be accomplished by typing the data directly into the SEDS database, or by using a data collection program that is deployed on a personal computer in the maintenance area. Where the data is collected using deployed program, the data is committed to the main SEDS database the maintenance personnel can no longer modify it.

A JRMET data review is convened on a regular basis during the R&M evaluation. This phase occurs after enough data is collected and entered into the data system. The data is distributed to the MET using computer-generated report called a Maintenance Event (MEVENT). The MEVENT presents R&M data from the Form 258(s) along with data codes that are added by the JRMET to characterize the data. The MEVENT is organized so entire failure events are presented in chronological order. This way the JRMET is able to form a complete picture of the failure, and the repair actions necessary to correct it.

After the JRMET reviews the data it is considered to be ready for analysis. At this point records that have been reviewed by the JRMET are inade available to the R&M Engineers and analyst for data reduction (i.e. published). Only records that have been reviewed by the JRMET are used for analysis. The JRMET Status data field (JRST) determines this.

Analysis is performed by the R&M Engineer using JRMET approved records. (JRST=0 or 2). During this phase the R&M Engineer uses SEDS to quantify the R&M performance of the test item.

After a JRMET meeting is concluded and the changes to the data are completed the R&M Engineer uses SEDS to write Deficiency Reports which are written to document performance issues observed In the test item. The R&M Engineer also uses the SEDS database to write status reports and at the end of the test program, a final report.

Figure 2:
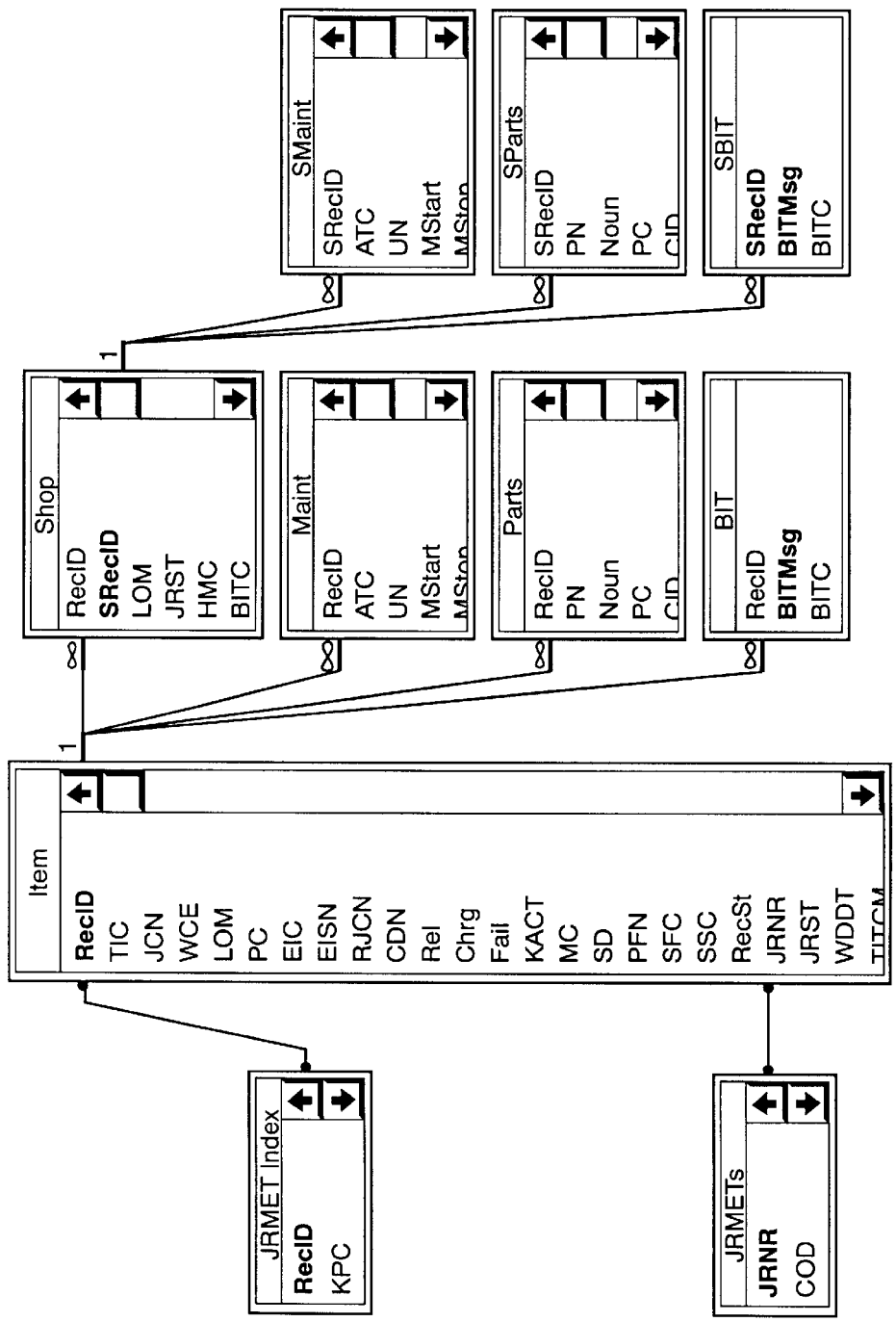
FIG. 2 illustrates the relationship of the main tables of the SEDS database.
Figure 3A:
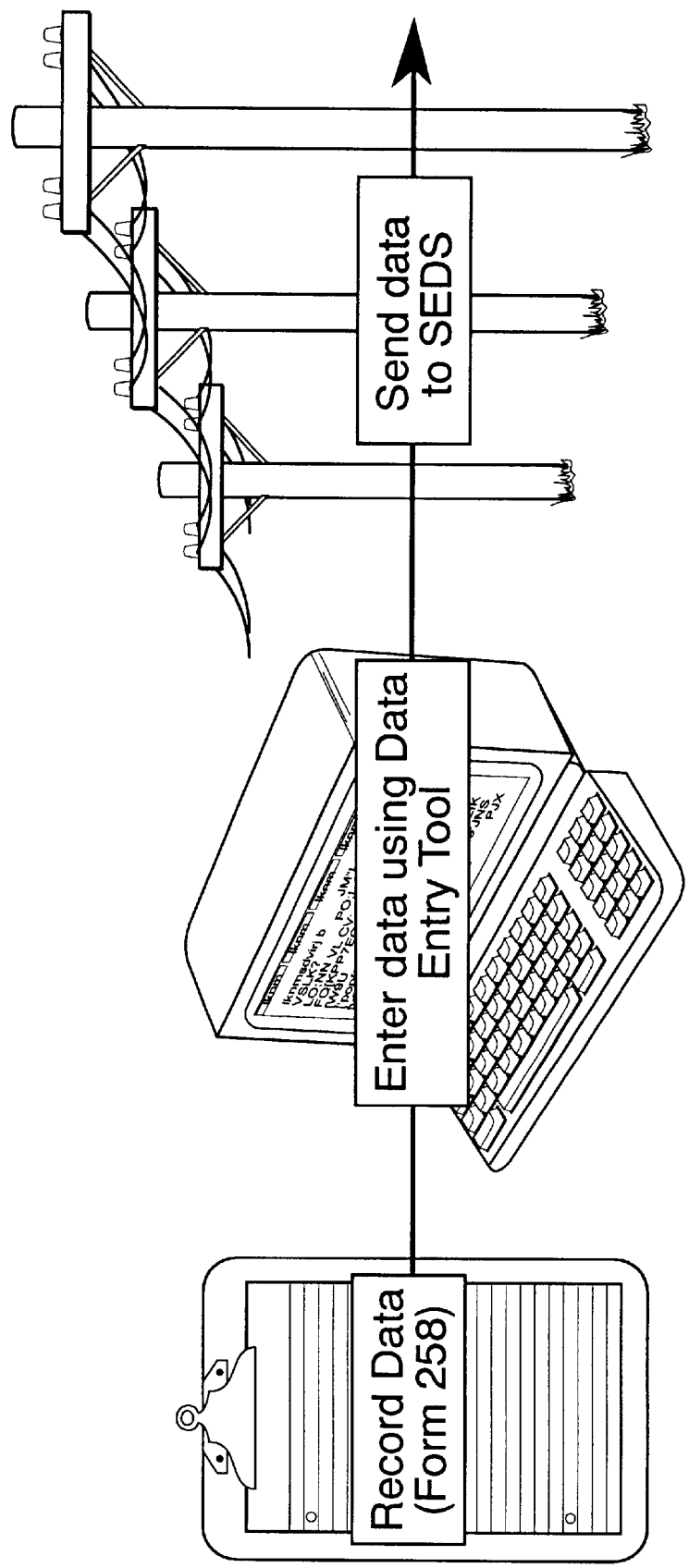
FIGS. 3a–3c illustrate the SEDS process.
Figure 3A:
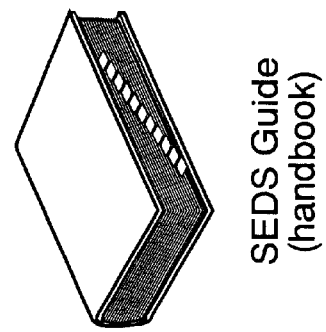
Figure 3B:
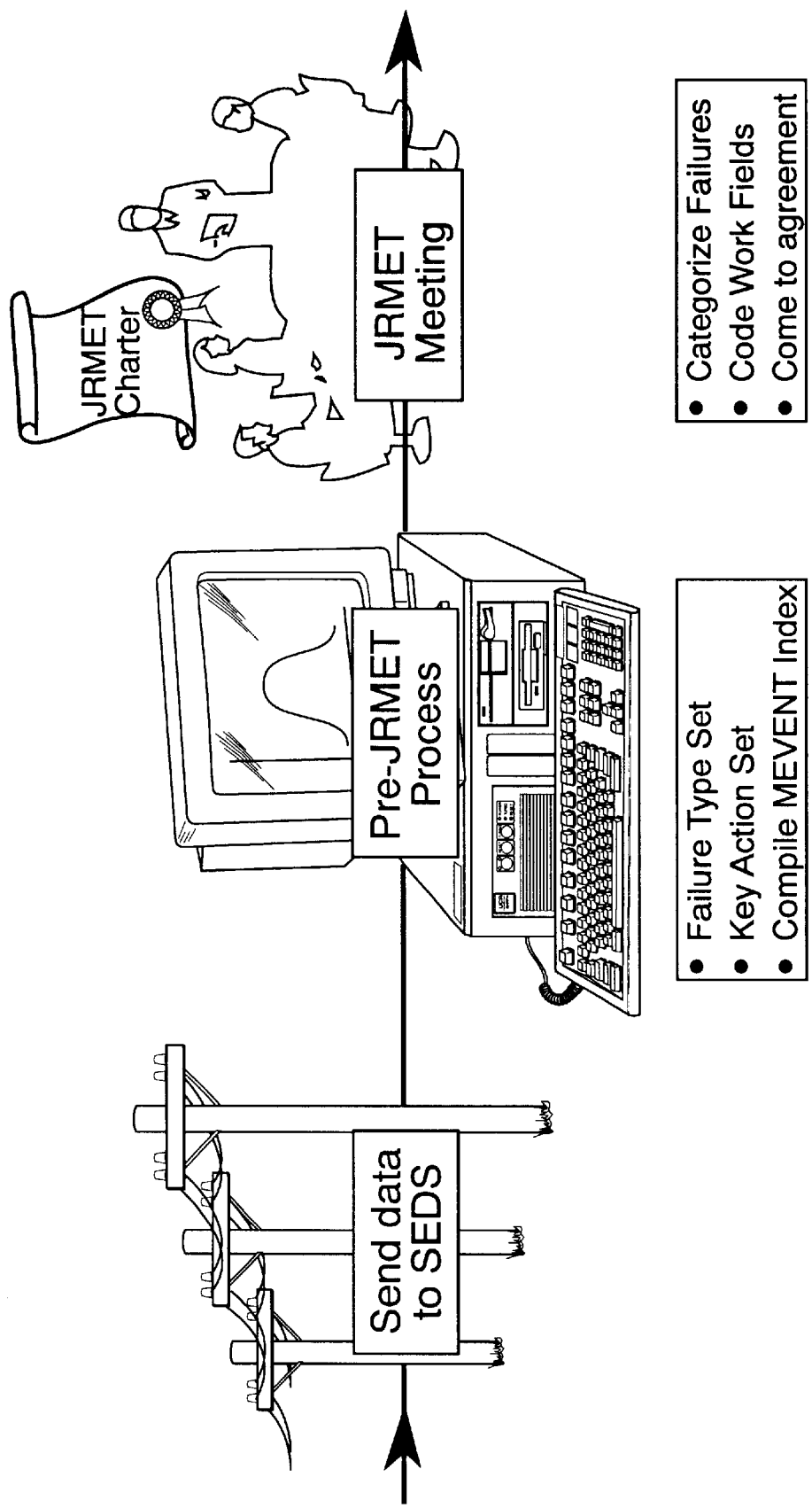
Figure 3C:
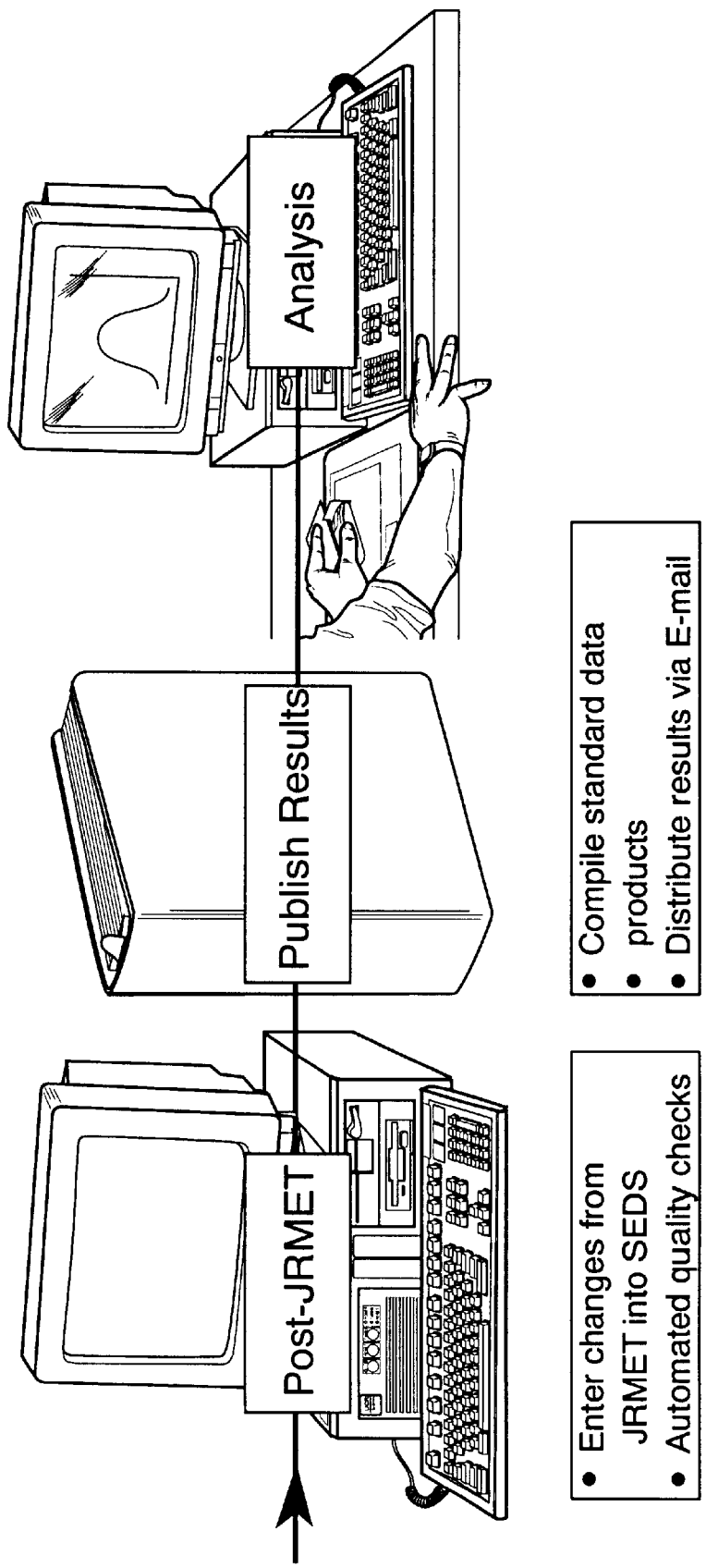
Figure 4:
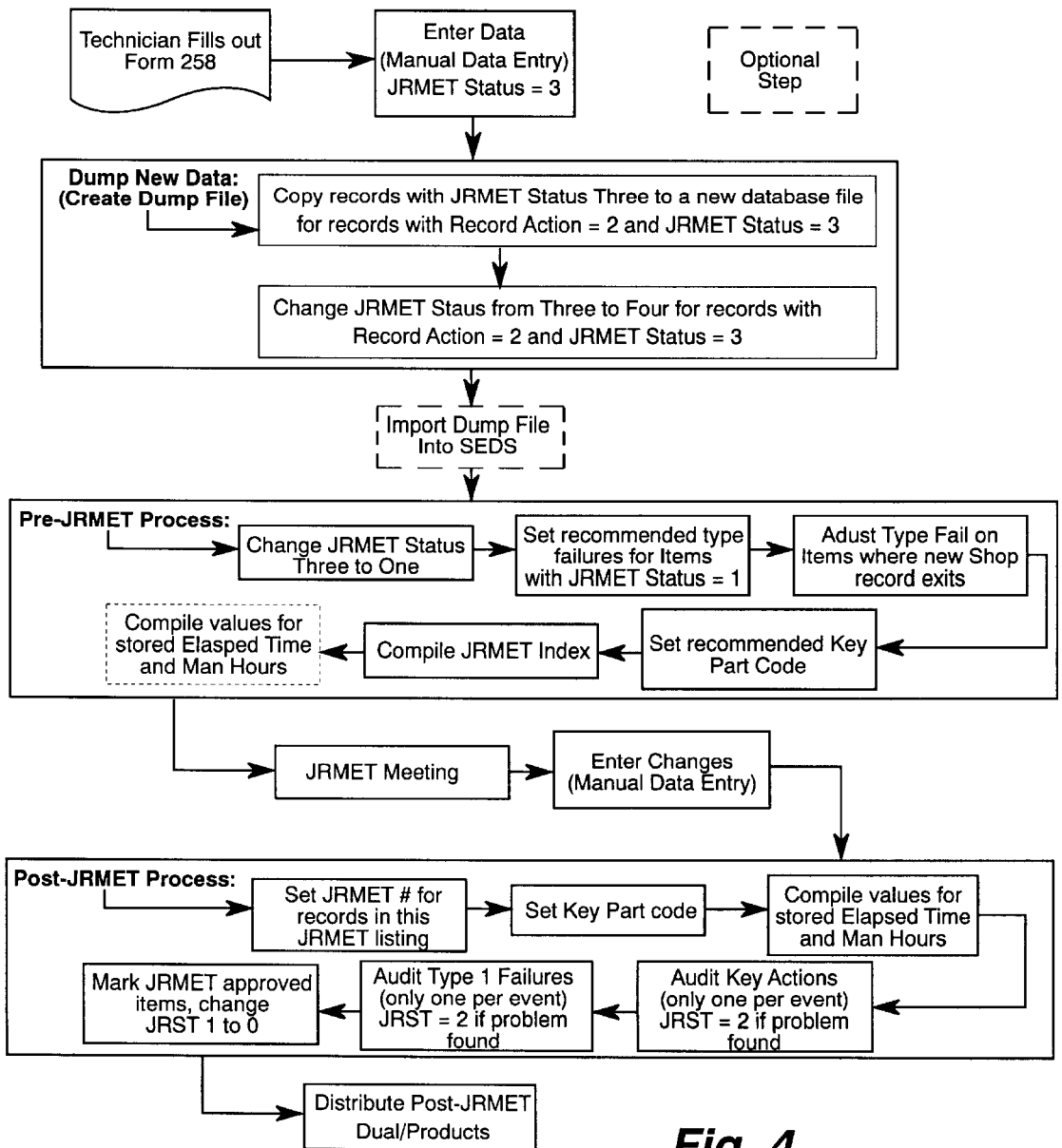
FIG. 4 is a flow chart of the SEDS data flow and processing.

A database is a collection of information that is stored in one or more tables. How these tables relate to one-another is called a database schema (or design). A graphical representation of the relationships between the main tables of the SEDS database is show in FIG. 2. These tables are stored in the SEDS backend. There are also look-up tables that are not depicted in the figure. The small 1 and infinity symbols indicate one-to-many relationships where referential integrity is enforced by the database system. Descriptions of each table are given in the following sections as well as the database dictionary in Appendix ***.

Data tables for the SEDS database are contained in two files. One file contains look-up tables in which the data never changes. This file will normally be named xxxx-SPT.MDB, where "xxxx" denotes the associated project (e.g. C130J). The second file contains the data that changes on a regular basis (each JRMET meeting). This file will normally be named Jnn-xxxx.MDB, where "nn" denotes the JRMET number and "xxxx" denotes the associated project.

The Item table is the "parent" table for the SEDS database system. That is, all of the other tables in the database are related to the Item table. For example, you cannot have a record in the Maint, BIT, or Parts table without first having a record in the Item table. Each "child" record must have a parent. This is known as "referential integrity" and it is enforced automatically by the database engine.

The item table is also the parent table for the Form 258-2 (Shop and Depot) tables. Without a record in the Item table, a Shop record cannot exist.

Maint: Data in the Maint (maintenance) table records the individual maintenance actions required to complete the maintenance task. Records in the Maint table have a many-to-one relationship with the Item table. This means that each record in the Item table can have many related (child) records in the Maint table.

BIT: Data in the BIT (Built-in-test) table records the individual BIT messages and effectiveness of the BIT indication. Records in the BIT table have a many-to-one relationship with the Item table.

Parts: Data in the Parts table records the piece-parts used to repair a line replacement unit. Records in the Parts table have a many-to-one relationship with the Item table.

Form 258-2 Tables: Data for the Form 258-1 is stored in the Item, Maint, BIT, and Parts Tables.

Additional information for each of the tables is given in the following sections.

Shop: Data in the Shop table records information from the Form 258-2 as well as database specific. Each record in the Shop table represents a single Form 258-2 and each (or several) shop record is related to a single record in the Item table.

Table relationships: Since the SEDS database system is a relational database, some of the database terms that describe the table relationships are important to understand. These terms are:

Table Relationship: How two tables relate to each other. This determines how the information in one table is linked to another table.

Parent Record: Database records on which child (related) records in other other table are based.

Child Record: Database records that are based upon a parent record in another table. Child records can also be the parent records for other tables.

Orphan Record: Database records in a table that do not have a parent record to link with.

Referential Integrity: Rules that the database engine use to enforce the relationships between parent and child records in related tables. For example, the database will not allow the user to create a child record without creating a parent record first. The database will also take care of housekeeping chores such as deleting all child records for a parent record when the parent record is deleted. This prevents the database from forming orphan records.

One-to-many Relationship: A referential integrity rule that enforces a parent-child relationship where for each parent record there is only one child record in a related table.

Form 258-1 Tables: Data for the Form 258-1 is stored in the Item, Maint, BIT, and Parts tables.

Additional information for each of the tables is given in the following sections.

Item: Data in the Item table records information from the Form 258-1 as well as database specific fields and JRMET work fields. Each record in the Item table represents a single Form 258-1, multiple Item records within a JCN on a specific test item represent an Event.

SMaint: Data in the SMaint (shop maintenance) table records the individual maintenance actions required to complete the shop maintenance task. Records in the Smaint table have a many-to-one relationship with the Shop table. This means that each record in the Shop table cam have many related (child) records in the Smaint table.

SBIT: Data in the SBIT (shop built-in-test) table records the individual BIT messages and effectiveness of the BIT indication. Records in the SBIT table have a many-to-one relationship with the Shop table.

Table 2 is a detailed breakdown of the SEDS process.

TABLE 2

SEDS PROCESS AND WORK-FIELDS SEDS DATABASE PROCESS

1. Maintainer completes data collection form, e.g. Form 258.
2. Enter data into database from data collection form (JRMET Status, JRST=3).
3. Export data files and forward data dump file to SEDS administrator (Change JRST to 4 in the data entry database, JRST is still 3 in the data dump file).
4. Append data dump file to SEDS (JRST=3).
5. Pre-JRMET Process:
   5.1 Change JRST=3 to JRST=1 (new Items to be reviewed by JRMET).
   5.2 Set Type Fail for new items (JRST=1). See Failure Type Recommendation Process.
   5.3 Adjust Failure Type based upon slew shop Items (JRST=1). See Failure Type Recommendation Process (i.e. modify failure type for the Item based upon additional information from shop maintenance).
   5.4 Set Key Action (KACT) for events in the MEVENT Index unless the JRMET has specified one (KACT=J), i.e. set Key Action code to "K" unless it is already set to "J".
   5.5 Compile MEVENT Index (Events where an Item has JRST=1 or 2).
   5.6 Compile new ETM.
6. Publish Pre-JRMET products.
7. JRMET meeting.
8. Enter data changes from JRMET and check changes (manual operation done by technician).
9. Pre-JRMET Process:
   9.1 Set JRMET Number for all records included in the MEVENT index.
   9.2 Reset Key Action (KACT) for events in the MEVENT Index unless the JRMET has specified one (KACT=1J), i.e. set Key Action code to "K" unless it is already set to or
   9.3 Compile new ETM.
   9.4 Audit for multiple Key Actions per event. Change JRST to 2 for items where a problem is found.
   9.5 Audit for multiple Type 1 failures per event. Change JRST to 2 for items where a problem is found.
   9.6 Mark JRMET approved items (JRST=1 changes to JRST=0).
10. Publish database and products.

SEDS will make a recommendation for a failure type the first time a record is reviewed by a JRMET, or when additional shop or depot data is added. After the JRMET approves a record (JRST=0) the failure type will be altered only if new shop or depot data is added at a latter date. The following process is used to determine failure type:

For each slew corrective maintenance record (where JRST=1 and Type Maintenance Code, TMC=B) make a list of How Malfunction Code (HMC) failure types where Units of Maintenance are greater than zero.

Look up the Failure Type for each HMC and Action Taken Code (ATC) combination in the Failure Determination Matrix.

Assign the lowest (most severe) failure type to the record.

TABLE 3

Work Fields, Characterize the Event

| | Work Field | Code | Definition |
| --- | --- | --- | --- |
| Does it count? | Relevance | X | Not relevant |
| | | E | Not relevant to contractual requirements (EAFB) |
| | | A | Not relevant to operational requirements (AFOTEC) |
| | | Null | Relevant (default) |
| How to count it? | Chargeable | X | Excluded from counts |
| | | E | Excluded from contractual count only (EAFB) |
| | | A | Excluded from operational count only (AFOTEC) |
| | | F | Exclude failure but count maintenance time |
| | | T | Exclude maintenance time but keep failure |
| | | Null | Chargeable (default) |
| Failure? | Failure * | 1 | Inherent |
| | | 2 | Induced |
| | | 6 | No defect, CND or RTOK |
| | | Null | No Failure (default) |
| What do we blame? | Key Action * | K | Item that is charged with even failures and repair time, assigned by SEDS software |
| | | J | Item that is charged with event failure and repair time, assigned by JRMET (overrides SEDS software) |
| | | Null | Item not charged with repair time (default) |
| Draw on supply? | Supply Demand | R | Repair put a demand on the supply system |
| | | Null | No demand on supply system (default) |
| Stop a mission? | Mission Critical | C | Critical failure |
| | | E | Critical in contractual model only (EAFB) |
| | | A | Critical in operational model only (AFOTEC) |
| We think we fixed it? | Pattern Failure | String | Pattern failure identification code |
| | | Null | No Pattern (default) |
| Software? | Software Failure | E | Enhancement |
| | | F | Failure |
| | | Null | Failure not software related (default) |

TABLE 3-continued

Work Fields, Characterize the Event

|  | Work Field | Code | Definition |
|---|---|---|---|
| How bad was it? | Software Severity | 1to5 | Software Severity code |
|  |  | Null | No code (default) |
| More paper? | Item Status | J | More information is required by JRMET |
|  |  | D | Item is Deferred Maintenance |
|  |  | S | Intermediate or Depot maintenance form pending |
|  |  | Null | Event is closed (default) |
| Want to see Again? | JRMET Status | 0 | JRMET approved item |
|  |  | 1 | New item |
|  |  | 2 | Bring back item for next JRMET |
| When was this Last reviewed? | JRMET Number | number | Number of JRMET item was last reviewed at |
|  |  | Null | Item has not been reviewed yet |

Failure Type Recommendation Process

SEDS will make a recommendation for a failure type the first time an Item is reviewed by a JRMET or when additional shop or depot data is added. After the JRMET approves an Item (JRST=0) the tailure type will be altered automatically only if new shop depot data is added at a latter date. The following process is used to determine failure type:

1. For each new corrective maintenance Item (Item where JRST=1 and Type Maintenance Code, TMC=B) make a list of How Mallnction Code (HMC) failure type where Units=1.
2. Look up the Failure Type for each HMC in the HMC vs. Action Taken Code (ATC) Matrix (suggested matrix shown below).
3. Assign the lowest (most severe) failure type to the Item.

TABLE 4

TYPE FAILURE DETERMINATION MATRIX

| ATC | Description | On Equipment HMC Type Failure | | | Off Equipment HMC Type Failure (Modifies failure on Copy 1) | | |
|---|---|---|---|---|---|---|---|
|  |  | 1 | 2 | 6 | 1 | 2 | 6 |
| A | Bench Checked, Repaired |  |  |  | 1 | 2 |  |
| B | Bench Checked, Serviceable |  |  |  |  |  | 6 |
| C | Bench Checked — Repair Deferred |  |  |  | 1 | 2 |  |
| D | Bench Checked — Transfered |  |  |  | 1 | 2 |  |
| E | Initial Installation |  |  | 6 |  |  |  |
| F | Repair | 1 | 2 | 6 | 1 | 2 | 6 |
| G | Repair/Replacement Minor Parts | 1 | 2 | 6 | 1 | 2 | 6 |
| H | Equipment Checked — No Repair Required | 6 | 6 | 6 |  |  |  |
| J | Calibrated — No Adjustment Required | 6 | 6 | 6 | 6 | 6 | 6 |
| K | Calibrated — Adjustment Required | 1 | 2 | 6 | 1 | 2 | 6 |
| L | Adjustment | 1 | 2 | 6 | 1 | 2 | 6 |
| M | Disassemble |  |  |  |  |  |  |
| N | Assemble |  |  |  |  |  |  |
| P | Removed | 1 | 2 | 6 |  |  |  |
| O | Installed |  |  | 6 |  |  |  |
| R | Remove And Replace | 1 | 2 | 6 |  |  |  |
| S | Remove And Reinstall |  |  |  |  |  |  |
| T | Remove for Cannibalization |  |  |  |  |  |  |
| U | Replace for Cannibalization |  |  |  |  |  |  |
| V | Clean | 1 | 2 | 6 | 1 | 2 | 6 |
| X | Test, Inspect, Service | 1 | 2 | 6 | 1 | 2 | 6 |
| Y | Troubleshoot |  |  |  |  |  |  |
| Z | Corrosion Treatment | 1 | 2 | 6 | 1 | 2 | 6 |
| 1 | Bench Checked — NRTS Repair Not Authorized |  |  |  | 1 | 2 | 6 |
| 2 | Bench Checked — NRTS Lack of Equipment |  |  |  | 1 | 2 | 6 |
| 3 | Bench Checked — NRTS Lack of Skills |  |  |  | 1 | 2 | 6 |
| 4 | Bench Checked — NRTS Lack of Parts |  |  |  | 1 | 2 | 6 |
| 5 | Bench Checked — NRTS Shop Backlog |  |  |  | 1 | 2 | 6 |
| 6 | Bench Checked — NRTS Lack of Technical Data |  |  |  | 1 | 2 | 6 |
| 7 | Bench Checked — NRTS Lack of Authority to Obtain Resources |  |  |  | 1 | 2 | 6 |
| 8 | Bench Checked — NRTS Return To Depot |  |  |  | 1 | 2 | 6 |
| 9 | Bench Checked — Condemned |  |  |  | 1 | 2 | 6 |

Key:
1 = Inherent Failure
2 = Induced Failure
6 = No Defect

Key Part Code and Key Action Recommendation Process For Events in the MEVENT Index:

1. Delete any Key Action codes (KACT) where KACT=K
2. Rank Items within an event by Report Date and last stop time.
3. Set KACT=K for Items with the following priority:
    3.1 Action with Type 1 failure (if more than one, use ranking scheme).
    3.2 Action with Type 2 failure (if more than one, use ranking scheme).
    3.3 Action with Type 6 failure (if more than one, use ranking scheme).
    3.4 No corrective maintenance.

Ranking Scheme: (ties move to next level)
Failure: 1,2,6, then null. If there is a tie then:
Level of Maintenance: Depot, Intermediate, then Organizational. If there is a tie then:
Intermediate or Depot Level Items: ATCs with a Unit (UN) of one ranked in order (highest to lowest): A92345678BFKGLXZVJ. If there is a tie then:
Last Intermediate of Depot Level Item. Organizational Level Items: ATCs with a Unit (UN) of one ranked in order (highest to lowest): RPFKGLTZJVWSHXEI. If there is a tie then:
Last Organizational Level Item.

SEDS Work-Fields

Work-fields are used by the JRMET to characterize a SEDS item (maintenance record) within a maintenance event (several records within a JCN). These are then used by SEDS analysis tools to calculate reliability and maintainability results.

| Work-field Name | Field Name | Code | Definition | COBOL SEDS |
|---|---|---|---|---|
| Relevance | REL | X | Not relevant | WF1 |
| | | E | Not relevant to contractual requirements (EAFB) | |
| | | A | Not relevant to operational requirements (AFOTEC) | |
| | | Null | Relevant (default) | |
| Chargeable | CHRG | X | Excluded from counts | WF2A |
| | | E | Excluded from contractual count only (EAFB) | |
| | | A | Excluded from operational count only (AFOTEC) | |
| | | F | Exclude failure but count maintenance time | |
| | | T | Exclude maintenance time but keep failure | |
| | | Null | Chargeable (default) | |
| Failure* | Fail | 1 | Inherent | WF2B |
| | | 2 | Induced | |
| | | 6 | No defect, CND or RTOK | |
| | | Null | No Failure (default) | |
| Key Action* | KACT | K | Item that is charged with event repair time, assigned by SEDS software | KWUC |
| | | J | Item that is charged with event repair time, assigned by JRMET (overides SEDS software) | |
| | | Null | (default) | |
| Supply Demand | SD | R | Repair put a demand on the supply system | WF1 |
| | | Null | No demand on supply system (default) | |
| Mission Critical | MC | C | Critical failure | WF3B |
| | | E | Critical in contractual model only (EAFB) | |
| | | A | Critical in operational model only (AFOTEC) | |
| | | Null | Not critical (default) | |
| Pattern | PFN | String (3) | Pattern failure identification code | WF4A |
| | | Null | No Pattern (default) | |
| SW Failure | SFC | E | Enhancement | WF5A |
| | | F | Failure | |
| | | Null | Failure not software related (default) | |
| SW Severity | SSC | 1 to 5 | Software Severity code | WF5B |
| | | Null | No code (default) | |
| Item Status | ITST | J | More information is required by JRMET | WF5C |
| | | D | Event is Deferred Maintenance | |
| | | S | Intermediate or Depot maintenance form pending | |
| | | Null | Event is closed (default) | |
| JRMET Status | JRST | 0 | JRMET approved item | WF8 |
| | | 1 | New item | |
| | | 2 | Bring back item for next JRMET | |
| | | 3 | New item from data import | |
| | | 4 | Item locked in data entry program (no edits) | |
| | | 5 | New record, held by data entry technician for clarification | |
| | | 6 | New record, held by data entry system for required information | |

-continued

| Work-field Name | Field Name | Code | Definition | COBOL SEDS |
|---|---|---|---|---|
| JRMET Number | JRNR | Integer | Number of JRMET item was last reviewed at | WF7 |

*Recommended or set by software, can be overridden by JRMET.

While the invention has been described in its presently preferred embodiment it is understood that the words which have been used are words of description rather that words of limitation and that changes within the purview of the appended claims may be made without departing from the scope and spirit of the invention in its broader aspects.

What is claimed is:

1. An automated reliability and maintainability process comprising the steps of:

using a personal computer for identifying equipment failures and failure types for a system of interest to a remotely located central computer which contains a reliability and maintainability analysis program, said system of interest being supported with spares in accordance with an established logistics practice;

activating the remotely located computer at predetermined intervals of time to conduct reliability and maintainability analysis for the system of interest to produce logistics recommendations to support the system;

having a human review to compare the logistics recommendations of the remotely located computer with the logistics practices being followed to determine if changes are needed; and inputting any changes in the logistics practices for the system of interest back into the remotely located computer wherein said inputting step is conducted using a personal computer.

* * * * *